United States Patent
Hook et al.

(10) Patent No.: US 8,328,349 B2
(45) Date of Patent: Dec. 11, 2012

(54) COMPOSITIONS COMPATIBLE WITH JET PRINTING AND METHODS THEREFOR

(75) Inventors: Kevin J. Hook, Grand Island, NY (US); Theodore F. Cyman, Jr., Grand Island, NY (US); Lawrence Pilon, Grand Island, NY (US); Jeffrey Zaloom, Getzville, NY (US)

(73) Assignee: Moore Wallace North America, Inc., Chicago, IL (US)

( * ) Notice: Subject to any disclaimer, the term of this patent is extended or adjusted under 35 U.S.C. 154(b) by 844 days.

(21) Appl. No.: 12/229,180

(22) Filed: Aug. 20, 2008

(65) Prior Publication Data

US 2009/0056577 A1 Mar. 5, 2009

Related U.S. Application Data

(60) Provisional application No. 60/965,361, filed on Aug. 20, 2007, provisional application No. 60/965,634, filed on Aug. 21, 2007, provisional application No. 60/965,753, filed on Aug. 22, 2007, provisional application No. 60/965,861, filed on Aug. 23, 2007, provisional application No. 60/965,744, filed on Aug. 22, 2007, provisional application No. 60/965,743, filed on Aug. 22, 2007.

(51) Int. Cl.
*B41J 2/01* (2006.01)

(52) U.S. Cl. ............ 347/103; 347/100; 347/96; 347/98; 347/107; 101/450.1; 101/451

(58) Field of Classification Search ............ 347/95–100, 347/103; 101/450.1, 451, 130; 523/160, 523/161; 106/31.13, 31.27, 31.6
See application file for complete search history.

(56) References Cited

U.S. PATENT DOCUMENTS

| | | | |
|---|---|---|---|
| 778,892 | A | 1/1905 | Read |
| 1,766,957 | A | 6/1930 | Smith |
| 2,129,071 | A | 9/1938 | Rowell |
| 2,200,363 | A | 5/1940 | Kreis |
| 2,203,849 | A | 6/1940 | Trist |
| 2,340,562 | A | 2/1944 | Rey |
| 2,350,382 | A | 6/1944 | Angel |
| 2,562,782 | A | 7/1951 | Frost |
| 2,722,175 | A | 11/1955 | Stitz |
| 2,763,204 | A | 9/1956 | Sims, Jr. |
| 3,060,848 | A | 10/1962 | Beutner |

(Continued)

FOREIGN PATENT DOCUMENTS

CA 2 392 730 10/2003

(Continued)

OTHER PUBLICATIONS

EPO Office Action dated Oct. 1, 2010, EP Application No. 08-006-593.1, Applicant Moore Wallace North America, Inc.

(Continued)

*Primary Examiner* — Matthew Luu
*Assistant Examiner* — Rut Patel
(74) *Attorney, Agent, or Firm* — McCracken & Frank LLC

(57) ABSTRACT

Methods for controlling application of a substance to a substrate involve the use of a gating agent that blocks the substance from the substrate. The methods may utilize ink jet technology to apply the gating agent directly to the substrate or to an intermediate surface. The gating agent composition includes a nonionic surfactant, and water. The gating agent composition does not contain a discernable amount of dye, pigment or other colorant agent.

10 Claims, 5 Drawing Sheets

U.S. PATENT DOCUMENTS

| | | | |
|---|---|---|---|
| 3,113,511 A | 12/1963 | Dalton | |
| 3,113,512 A | 12/1963 | Newman | |
| 3,220,345 A | 11/1965 | Kline et al. | |
| 3,376,810 A | 4/1968 | Blake et al. | |
| 3,390,631 A | 7/1968 | Koszul | |
| 3,589,289 A | 6/1971 | Gosnell | |
| 3,648,603 A | 3/1972 | Kaminstein | |
| 3,741,118 A | 6/1973 | Carley | |
| 3,790,703 A | 2/1974 | Carley | |
| 3,800,699 A | 4/1974 | Carley | |
| 3,986,452 A | 10/1976 | Dahlgren | |
| 4,010,686 A | 3/1977 | Harris | |
| 4,044,671 A | 8/1977 | Hou et al. | |
| 4,069,759 A | 1/1978 | Endo et al. | |
| 4,368,669 A | 1/1983 | Love, III | |
| 4,404,907 A | 9/1983 | Köbler et al. | |
| 4,718,340 A | 1/1988 | Love, III | |
| 4,729,310 A | 3/1988 | Love, III | |
| 4,808,443 A | 2/1989 | Minamoto et al. | |
| 4,833,486 A | 5/1989 | Zerillo | |
| 4,833,530 A | 5/1989 | Kohashi | |
| 5,106,414 A | 4/1992 | Kunichika et al. | |
| 5,129,321 A | 7/1992 | Fadner | |
| 5,188,033 A | 2/1993 | Fadner | |
| 5,202,206 A | 4/1993 | Tam | |
| 5,221,330 A | 6/1993 | Matsumoto et al. | |
| 5,294,946 A | 3/1994 | Gandy et al. | |
| 5,312,654 A | 5/1994 | Arimatsu et al. | |
| 5,333,548 A | 8/1994 | Fadner | |
| 5,366,000 A | 11/1994 | Reimann et al. | |
| 5,389,958 A | 2/1995 | Bui et al. | |
| 5,462,591 A | 10/1995 | Karandikar et al. | |
| 5,476,043 A | 12/1995 | Okuda et al. | |
| 5,495,803 A | 3/1996 | Gerber et al. | |
| 5,501,150 A | 3/1996 | Leenders et al. | |
| 5,505,126 A | 4/1996 | Ohno et al. | |
| 5,511,477 A | 4/1996 | Adler et al. | |
| 5,552,817 A | 9/1996 | Kuehnle | |
| 5,554,212 A | 9/1996 | Bui et al. | |
| 5,560,608 A | 10/1996 | Silverschotz | |
| 5,644,981 A | 7/1997 | Ohno et al. | |
| 5,681,065 A | 10/1997 | Rua, Jr. et al. | |
| 5,697,297 A | 12/1997 | Rasmussen | |
| 5,738,013 A | 4/1998 | Kellett | |
| 5,765,083 A | 6/1998 | Shinohara | |
| 5,809,893 A | 9/1998 | Gamperling et al. | |
| 5,820,932 A | 10/1998 | Hallman et al. | |
| 5,852,975 A | 12/1998 | Miyabe et al. | |
| 5,879,748 A * | 3/1999 | Conti et al. | 427/391 |
| 5,906,156 A | 5/1999 | Shibuya et al. | |
| 5,953,988 A | 9/1999 | Vinck | |
| 5,966,154 A | 10/1999 | DeBoer | |
| 5,969,740 A | 10/1999 | Maeda et al. | |
| 6,002,904 A | 12/1999 | Yoshida et al. | |
| 6,006,666 A | 12/1999 | Gottling | |
| 6,050,193 A | 4/2000 | DeBoer et al. | |
| 6,079,331 A | 6/2000 | Koguchi et al. | |
| 6,079,806 A | 6/2000 | Wen et al. | |
| 6,082,263 A | 7/2000 | Koguchi et al. | |
| 6,113,231 A | 9/2000 | Burr et al. | |
| 6,120,665 A | 9/2000 | Chiang et al. | |
| 6,125,750 A | 10/2000 | Achelpohl | |
| 6,125,755 A | 10/2000 | Link et al. | |
| 6,126,281 A | 10/2000 | Shimoda et al. | |
| 6,131,514 A | 10/2000 | Simons | |
| 6,152,037 A | 11/2000 | Ishii et al. | |
| 6,164,757 A | 12/2000 | Wen et al. | |
| 6,173,647 B1 | 1/2001 | Kakuta et al. | |
| 6,187,380 B1 | 2/2001 | Hallman et al. | |
| 6,196,129 B1 | 3/2001 | Kellett | |
| 6,231,177 B1 | 5/2001 | Cherukuri et al. | |
| 6,283,031 B1 | 9/2001 | Kakuta et al. | |
| 6,283,589 B1 | 9/2001 | Gelbart | |
| 6,295,928 B1 | 10/2001 | Heinzl et al. | |
| 6,298,780 B1 | 10/2001 | Ben-Horin et al. | |
| 6,315,916 B1 | 11/2001 | Deutsch et al. | |
| 6,318,264 B1 | 11/2001 | D'Heureuse et al. | |
| 6,341,559 B1 | 1/2002 | Riepenhoff et al. | |
| 6,354,207 B1 | 3/2002 | Maekawa et al. | |
| 6,367,380 B1 | 4/2002 | Whelan | |
| 6,386,696 B1 | 5/2002 | Rodi et al. | |
| 6,393,980 B2 | 5/2002 | Simons | |
| 6,402,317 B2 | 6/2002 | Yanagawa et al. | |
| 6,416,175 B2 | 7/2002 | Furukawa et al. | |
| 6,422,696 B1 | 7/2002 | Takahashi et al. | |
| 6,439,713 B1 | 8/2002 | Noguchi et al. | |
| 6,470,799 B2 | 10/2002 | Nakazawa et al. | |
| 6,477,948 B1 | 11/2002 | Nissing et al. | |
| 6,520,087 B2 | 2/2003 | Heinzl et al. | |
| 6,526,886 B2 | 3/2003 | Loccufier et al. | |
| 6,536,873 B1 | 3/2003 | Lee et al. | |
| 6,539,856 B2 | 4/2003 | Jones et al. | |
| 6,543,360 B2 | 4/2003 | Sasaki et al. | |
| 6,558,458 B1 | 5/2003 | Gloster | |
| 6,566,039 B1 | 5/2003 | Teng | |
| 6,585,367 B2 | 7/2003 | Gore | |
| 6,595,631 B2 | 7/2003 | Tanikawa et al. | |
| 6,634,295 B1 | 10/2003 | Newington et al. | |
| 6,644,183 B2 | 11/2003 | Takasawa et al. | |
| 6,648,468 B2 | 11/2003 | Shinkoda et al. | |
| 6,652,631 B2 | 11/2003 | Itakura | |
| 6,662,723 B2 | 12/2003 | Loccufier et al. | |
| 6,679,170 B2 | 1/2004 | Mori | |
| 6,699,640 B2 | 3/2004 | Veruschueren et al. | |
| 6,736,500 B2 | 5/2004 | Takahashi et al. | |
| 6,739,260 B2 | 5/2004 | Damme et al. | |
| 6,745,693 B2 | 6/2004 | Teng | |
| 6,758,140 B1 | 7/2004 | Szumia et al. | |
| 6,772,687 B2 | 8/2004 | Damme et al. | |
| 6,779,444 B2 | 8/2004 | Hauptmann et al. | |
| 6,780,305 B2 | 8/2004 | Nishino et al. | |
| 6,783,228 B2 | 8/2004 | Szumia et al. | |
| 6,815,075 B2 | 11/2004 | Kasai et al. | |
| 6,815,366 B2 | 11/2004 | Higuchi | |
| 6,851,363 B2 | 2/2005 | Schneider | |
| 6,852,363 B2 | 2/2005 | Loccufier et al. | |
| 6,862,992 B2 | 3/2005 | Nakazawa et al. | |
| 6,906,019 B2 | 6/2005 | Nitzan et al. | |
| 6,918,663 B2 | 7/2005 | Schaschek et al. | |
| 6,935,735 B2 | 8/2005 | Tanikawa et al. | |
| 6,983,693 B2 | 1/2006 | Simons | |
| 7,070,269 B2 | 7/2006 | Tanikawa et al. | |
| 7,191,703 B2 | 3/2007 | Dilling | |
| 7,191,705 B2 | 3/2007 | Berg et al. | |
| 7,240,998 B2 | 7/2007 | Murakami et al. | |
| 7,281,790 B2 | 10/2007 | Mouri et al. | |
| 7,311,396 B2 | 12/2007 | Kwon et al. | |
| 7,523,704 B2 | 4/2009 | Domotor | |
| 7,691,280 B2 | 4/2010 | Waldrop et al. | |
| 7,959,278 B2 | 6/2011 | Regan et al. | |
| 2001/0020964 A1 * | 9/2001 | Irihara et al. | 347/43 |
| 2001/0022596 A1 | 9/2001 | Korol | |
| 2001/0040615 A1 | 11/2001 | Beauchamp et al. | |
| 2001/0042460 A1 | 11/2001 | Yoshida | |
| 2002/0001004 A1 | 1/2002 | Mantell et al. | |
| 2002/0014169 A1 | 2/2002 | Siler et al. | |
| 2002/0017209 A1 | 2/2002 | Gutfleisch et al. | |
| 2002/0038611 A1 | 4/2002 | Naniwa et al. | |
| 2002/0043171 A1 | 4/2002 | Loccufier et al. | |
| 2002/0056388 A1 | 5/2002 | Makino | |
| 2002/0100383 A1 | 8/2002 | McPherson et al. | |
| 2002/0104455 A1 | 8/2002 | Deutsch et al. | |
| 2002/0139268 A1 | 10/2002 | Emery et al. | |
| 2002/0154188 A1 | 10/2002 | Hiyane et al. | |
| 2003/0089261 A1 | 5/2003 | Landsman | |
| 2003/0103093 A1 | 6/2003 | Vanhooydonck | |
| 2003/0128249 A1 | 7/2003 | Booth | |
| 2003/0128250 A1 | 7/2003 | Booth | |
| 2003/0153649 A1 | 8/2003 | Bromberg | |
| 2003/0159607 A1 | 8/2003 | Nitzan et al. | |
| 2003/0190557 A1 | 10/2003 | Lee et al. | |
| 2003/0210298 A1 | 11/2003 | Madeley | |
| 2003/0210314 A1 | 11/2003 | Palmer et al. | |
| 2004/0053011 A1 | 3/2004 | Behm et al. | |
| 2004/0085395 A1 | 5/2004 | Madeley | |
| 2004/0089179 A1 | 5/2004 | Link | |
| 2004/0090508 A1 | 5/2004 | Chowdry et al. | |

| | | | | | | |
|---|---|---|---|---|---|---|
| 2004/0090516 | A1 | 5/2004 | Gruetzmacher et al. | JP | 62-025081 | 2/1987 |
| 2004/0103801 | A1 | 6/2004 | Miller et al. | JP | 63-109052 | 5/1988 |
| 2004/0103803 | A1 | 6/2004 | Price et al. | JP | 63-125534 | 8/1988 |
| 2004/0109055 | A1 | 6/2004 | Pan et al. | JP | 2-98482 | 4/1990 |
| 2004/0129158 | A1 | 7/2004 | Figov et al. | JP | 02-269094 | 11/1990 |
| 2004/0135276 | A1 | 7/2004 | Nielsen et al. | JP | 4-69244 | 3/1992 |
| 2004/0154489 | A1 | 8/2004 | Deutsch et al. | JP | 4-97236 | 3/1992 |
| 2004/0182270 | A1 | 9/2004 | Wiedemer et al. | JP | 4-97848 | 3/1992 |
| 2004/0187720 | A1 | 9/2004 | Naniwa et al. | JP | 6-225081 | 8/1994 |
| 2004/0250836 | A1 | 12/2004 | Koppelkamm et al. | JP | 6-270380 | 9/1994 |
| 2005/0028696 | A1 | 2/2005 | Price et al. | JP | 8-310101 | 11/1996 |
| 2005/0056169 | A1 | 3/2005 | Hashimoto et al. | JP | 9-85929 | 3/1997 |
| 2005/0115429 | A1 | 6/2005 | Link | JP | 09-267549 | 10/1997 |
| 2005/0122355 | A1 | 6/2005 | Kanda et al. | JP | 10-235989 | 9/1998 |
| 2005/0181187 | A1 | 8/2005 | Vosseler et al. | JP | 10-286939 | 10/1998 |
| 2005/0204945 | A1 | 9/2005 | Sonokawa | JP | 2946201 | 10/1998 |
| 2005/0211130 | A1 | 9/2005 | Watanabe | JP | 11-302585 | 11/1999 |
| 2005/0223927 | A1 | 10/2005 | Wiedemer | JP | 11-320865 | 11/1999 |
| 2005/0270351 | A1 | 12/2005 | Mouri et al. | JP | 2002-536462 | 8/2000 |
| 2006/0011817 | A1 | 1/2006 | Harush et al. | JP | 2000-272261 | 10/2000 |
| 2006/0040210 | A1 | 2/2006 | Eck et al. | JP | 2001-212956 | 8/2001 |
| 2006/0066704 | A1 | 3/2006 | Nishida | JP | 2001-225437 | 8/2001 |
| 2006/0075916 | A1 | 4/2006 | Edwards et al. | JP | 2002-127354 | 5/2002 |
| 2006/0075917 | A1 | 4/2006 | Edwards | JP | 2002-326455 | 11/2002 |
| 2006/0077243 | A1 | 4/2006 | Edwards | JP | 2002-361833 | 12/2002 |
| 2006/0077244 | A1 | 4/2006 | Edwards | JP | 2003-25554 | 1/2003 |
| 2006/0102025 | A1 | 5/2006 | Wittemann | JP | 2003-80816 | 3/2003 |
| 2006/0132566 | A1* | 6/2006 | Desie et al. ............... 347/100 | JP | 2003-237220 | 8/2003 |
| 2006/0201361 | A1 | 9/2006 | Wiedemer | JP | 2004-66816 | 3/2004 |
| 2006/0216525 | A1 | 9/2006 | Huybrechts et al. | JP | 2004-98682 | 4/2004 |
| 2006/0284951 | A1 | 12/2006 | Ikeda et al. | JP | 2004-299167 | 10/2004 |
| 2007/0062389 | A1 | 3/2007 | Link | JP | 2005-059458 | 3/2005 |
| 2007/0068404 | A1 | 3/2007 | Hirahara et al. | JP | 2005-074693 | 3/2005 |
| 2007/0137509 | A1 | 6/2007 | Fork | JP | 3756943 | 3/2005 |
| 2007/0164559 | A1 | 7/2007 | Kozdras | JP | 2005-313490 | 11/2005 |
| 2007/0199457 | A1 | 8/2007 | Cyman et al. | WO | WO 94/11191 | 5/1994 |
| 2007/0199458 | A1 | 8/2007 | Cyman et al. | WO | WO 99/17938 | 4/1999 |
| 2007/0199459 | A1 | 8/2007 | Cyman et al. | WO | WO 01-34394 | 5/2001 |
| 2007/0199460 | A1 | 8/2007 | Cyman et al. | WO | WO 01-49506 | 7/2001 |
| 2007/0199461 | A1 | 8/2007 | Cyman et al. | WO | WO 01-54915 | 8/2001 |
| 2007/0199462 | A1 | 8/2007 | Cyman et al. | WO | WO 2004/039586 | 5/2004 |
| 2007/0200794 | A1 | 8/2007 | Mueller et al. | WO | WO 2007-071551 | 6/2007 |
| 2007/0204755 | A1 | 9/2007 | Moreau | | | |
| 2007/0227383 | A1 | 10/2007 | Decre et al. | | | |
| 2008/0271627 | A1 | 11/2008 | Teng | | | |
| 2009/0056578 | A1 | 3/2009 | DeJoseph et al. | | | |
| 2009/0064884 | A1 | 3/2009 | Hook et al. | | | |
| 2009/0064886 | A1 | 3/2009 | Hook et al. | | | |
| 2009/0213201 | A1 | 8/2009 | Numata et al. | | | |

FOREIGN PATENT DOCUMENTS

| | | |
|---|---|---|
| CN | 1383992 | 12/2002 |
| DE | 4327212 | 2/1995 |
| DE | 10245066 | 4/2003 |
| EP | 101 266 | 2/1984 |
| EP | 0126479 | 11/1984 |
| EP | 0588399 | 3/1994 |
| EP | 0590164 | 4/1994 |
| EP | 601 531 | 6/1994 |
| EP | 0646458 | 4/1995 |
| EP | 882 584 | 12/1998 |
| EP | 0883026 | 12/1998 |
| EP | 911 154 | 4/1999 |
| EP | 911 155 | 4/1999 |
| EP | 0936064 | 8/1999 |
| EP | 965 444 | 12/1999 |
| EP | 1 118 470 | 7/2001 |
| EP | 1 118 471 | 7/2001 |
| EP | 1 118 472 | 7/2001 |
| EP | 1170122 | 1/2002 |
| EP | 1177514 | 2/2002 |
| EP | 1177914 | 2/2002 |
| EP | 1 426 193 | 6/2004 |
| EP | 1 522 404 | 4/2005 |
| EP | 1 547 793 | 6/2005 |
| JP | 53-15905 | 2/1978 |
| JP | 56-105960 | 8/1981 |
| JP | 56-113456 | 9/1981 |
| JP | 58-217567 | 12/1983 |

OTHER PUBLICATIONS

EPO Office Action dated Jul. 28, 2010, EP Application No. 07-751-214.3, Applicant Moore Wallace North America, Inc.
Letter to EPO dated Aug. 12, 2010 with attachment, EP Application No. 08-006-593.1, Applicant Moore Wallace North America, Inc.
Letter to EPO dated Jul. 19, 2010 with attachment, EP Application No. 08828001.1, Applicant Moore Wallace North America, Inc.
EPO Office Action dated Jul. 28, 2010, EP Application No. 08-006-593.1, Applicant Moore Wallace North America, Inc.
Response letter to EPO for Appl. No. 08006594.9, dated Nov. 26, 2009, and attached amendments and EP search report 08006594 Jan. 12, 2009.
U.S. Appl. No. 61/278,915, Inventors DeJoseph, et al., filed Oct. 14, 2009.
U.S. Appl. No. 61/254,101, Inventors DeJoseph et al., filed Oct. 22, 2009.
Industry News dated Jun. 16, 2008, http://www.dealercommunicator.com/indnew.htm. (2 pages).
"Amendment of the Claims" for PCT/US2008/009893 dated Mar. 20, 2009, (2 pages).
"Amendment of the Claims" for PCT/US2008/009910 dated Mar. 19, 2009, (3 pages).
International Search Report and Written Opinion, International Application No. PCT/US2007/004437 dated Sep. 3, 2007.
International Search Report and Written Opinion, International Application No. PCT/US2007/004442 dated Aug. 28, 2007.
International Search Report and Written Opinion, International Application No. PCT/US2007/004444 dated Aug. 28, 2007.
International Search Report and Written Opinion, International Application No. PCT/US2007/004438 dated Aug. 28, 2007.
International Search Report and Written Opinion, International Application No. PCT/US2007/004440 dated Aug. 28, 2007.

International Search Report and Written Opinion, International Application No. PCT/US2007/004441 dated Aug. 28, 2007.
International Preliminary Report on Patentability dated Sep. 4, 2008, International Application No. PCT/US2007/004437 International filing date Feb. 21, 2007.
International Preliminary Report on Patentability dated Sep. 4, 2008, International Application No. PCT/US2007/004438 International filing date Feb. 21, 2007.
International Preliminary Report on Patentability dated Sep. 4, 2008, International Application No. PCT/US2007/004440 International filing date Feb. 21, 2007.
International Preliminary Report on Patentability dated Sep. 4, 2008, International Application No. PCT/US2007/004441 International filing date Feb. 21, 2007.
International Preliminary Report on Patentability dated Sep. 4, 2008, International Application No. PCT/US2007/004442 International filing date Feb. 21, 2007.
International Preliminary Report on Patentability dated Sep. 4, 2008, International Application No. PCT/US2007/004444 International filing date Feb. 21, 2007.
International Search Report and Written Opinion for PCT/US2008/009910 dated Jan. 20, 2009.
International Preliminary Report on Patentability and Written Opinion for PCT/US2008/009910 dated Mar. 4, 2010.
International Preliminary Report on Patentability and Written Opinion for PCT/US2008/009901 dated Mar. 4, 2010.
International Preliminary Report on Patentability and Written Opinion for PCT/US2008/009911 dated Mar. 4, 2010.
International Preliminary Report on Patentability and Written Opinion for PCT/US2008/009893, dated Mar. 4, 2010.
International Search Report and Written Opinion for PCT/US2008/009893 dated Jan. 23, 2009.
Search Report in EP 08 00 6593 dated Jan. 12, 2009.
Search Report in EP 08 00 6594 dated Jan. 12, 2009.
3rd Supplemental Information Disclosure Statement & Interview Summary dated, Apr. 28, 2010 for U.S. Appl. No. 11/709,396.
EPO Office Action for Appl. No. 077-751-214.3-1251, dated Dec. 10, 2009, and attached Jul. 1, 2009 letter to EPO and amendments.
Letter to EPO dated Jul. 19, 2010 with attachment, EP Application No. 08795460.8, Applicant Moore Wallace North America, Inc.
Letter to EPO dated Dec. 7, 2010, with attachments, EP Application No. 08-006-593.1, Applicant Moore Wallace North America, Inc.
Letter to EPO dated Nov. 30, 2010, with attachments, EP Application No. 07-751-214.3, Applicant Moore Wallace North America, Inc.
BASF Corporation 1999, Table of Contents, (37 pages).
BASF Corporation 2002 Technical Bulletin, "Pluronic® F127 Block Copolymer Surfactant", (1 page).
Nobuhiro et al., Abstract of "Application of Solid Ink Jet Technology to a Direct Plate Maker," Science Links Japan, 1999, 1 page.
Lamont Wood, 3-D Home Printers Could Change Economy Oct. 11, 2007, URL: http://www/msnbc.msn.com/id/21252137/, (2 pages).
W. Shen et al., "A New Understanding on the Mechanism of Fountain Solution in the Prevention of Ink Transfer to the Non-image Area in Conventional Offset Lithography", J. Adhesion Sci. Technol., vol. 18, No. 15-16, pp. 1861-1887, (2004), (27 pages).
Air Products, Surfynol® 400 Series Surfactants, (3 pages).
"Amine Ethoxylates," (Jun. 26, 2008), URL: http://www.huntsman.com/performance_products/Index.cfm?PageID=5723&PrintPage=1&Showtitle=1, (1 page).
"Effect of Polyether Monoamine Structure on Pigment Dispersant Properties," (Feb. 2, 2009), Paint & Coatings Industry, (Mar. 1, 2006), URL: http://www.accessmylibrary.com/comsite5/bin/aml_landing_tt.pl?purchase_type=ITM & item . . . , (5 pages).
R. Steitz et al., "Experimental Report: Does the Chemical Nature of the Substrate Trigger Net Adsorption of Pluronic F127?", BENSC, (Jan. 15, 2003), (1 page).
BASF, Key Features & Benefits, Joncryl® 50, (2 pages); Joncryl® 52 (2 pages); Joncryl® 60 (2 pages); Joncryl® 61 (2 pages); Joncryl® 678 (3 pages); Joncryl® 682 (3 pages), (Mar. 23, 2007).
Polyethylenimines (General Information), (3 pages).
Nissan Chemical—Colloidal Silica, "Snowtex®", URL: http://www.nissanchem-usa.com/snowtex.php, (Jun. 26, 2008), (8 pages).

Huntsman Corporation 2005 Technical Bulletin, "Surfonic® T-2 Surfactant", (2 pages).
Huntsman Corporation 2007 Technical Bulletin, "The Use of SURFONAMINE® Amines in Ink and Pigment Applications", (5 pages).
H. Kipphan: "Handbook of Print Media" 2001, Springer, Berlin, XP002446641, p. 52-55.
Katherine O'Brien, "CTP in Small Packages," American Printer, Sep. 1, 1998, 4 pages.
Gloster et al., Abstract of "Direct Computer to Plate Printing," Society for Imaging Science and Technology, Oct. 2001, 1 page.
Response letter to EPO for Appl. No. 08-006-593.1-1251, dated Feb. 8, 2010, and attached amendments.
EPO Office Action for Appl. No. 077-751-211.9-1251, dated Sep. 22, 2009, and attached Jul. 1, 2009 letter to EPO and amendments.
Response letter to EPO for Appl. No. 077-751-211.9-1251, dated Jan. 29, 2010, and attached amendments.
EPO Office Action for Appl. No. 077-751-214.3-1251, dated Aug. 3, 2009, and attached Jul. 1, 2009 letter to EPO and amendments.
Response letter to EPO for Appl. No. 077-751-214.3-1251, dated Oct. 21, 2009.
EPO Office Action for Appl. No. 08-006-593.1-1251, dated Oct. 8, 2009.
Response letter to EPO for Appl. No. 077-751-214.3-1251, dated Mar. 31, 2010, and attached amendments.
News release "Hitachi Koki Imaging Solutions, Inc. Becomes Hitachi Printing Solutions America, Inc."
Letter from Mr. Qi Xue regarding Second Office Action from Chinese Patent Office dated Nov. 29, 2010, Chinese Patent Application No. 200780006170.9, Applicant Moore Wallace North America, Inc.
Second Office Action dated Nov. 3, 2010, with English translation attached, Chinese Patent Application No. 200780006170.9, Applicant Moore Wallace North America, Inc.
Letter to Mr. Qi Xue dated Jan. 4, 2011, Chinese Patent Application No. 200780006170.9, Applicant Moore Wallace North America, Inc.
Letter from Mr. Qi Xue dated Jan. 7, 2011, Chinese Patent Application No. 200780006170.9, Applicant Moore Wallace North America, Inc.
Letter to Mr. Qi Xue dated Jan. 12, 2011 regarding Jan. 7, 2011 communication, Chinese Patent Application No. 200780006170.9, Applicant Moore Wallace North America, Inc.
Letter from Mr. Qi Xue dated Jan. 13, 2011, Chinese Patent Application No. 200780006170.9, Applicant Moore Wallace North America, Inc.
Letter to Mr. Qi Xue dated Jan. 12, 2011 regarding Jan. 12, 2011 communication, Chinese Patent Application No. 200780006170.9, Applicant Moore Wallace North America, Inc.
Letter from Mr. Qi Xue dated Jan. 18, 2011 regarding Second Office Action Response, Chinese Patent Application No. 200780006170.9, Applicant Moore Wallace North America, Inc.
Second Office Action Response dated Jan. 18, 2011, with English translation attached, Chinese Patent Application No. 200780006170.9, Applicant Moore Wallace North America, Inc.
Email to Mr. Qi Xue dated Mar. 9, 2011, with substitute Response to Second Office Action attached, Chinese Patent Application No. 200780006170.9, Applicant Moore Wallace North America, Inc.
www.flickr.com, "MacWorld Magazine: Cover Art Woes", website, http://www.flickr.com/photos/66071596@N00/3964123486/ (printed on Mar. 8, 2011).
www.livedocs.adobe.com, "Fill a selection or layer with a color", website, http://livedocs.adobe.com/en_US/Photoshop/10.0/help.html?content=WSfd1234e1c4b69f30ea53e41001031ab64-77d4.html (printed on Mar. 8, 2011).
www.magazinepublisher.com, "Mailing Magazines", website, http://www.magazinepublisher.com/mailing.html (printed on Mar. 8, 2011).
www.printindustry.com, "Magazine Cover Wraps", website, http://www.printindustry.com/Newsletters/Newsletter---67.aspx (printed on Mar. 8, 2011).
www.mdprint.com, "M&D Printing Periodical Co-mailing Template Inkjet Knockout Version", available at http://www.mdprint.com/knockout%20template.pdf, (printed on Mar. 8, 2011).

www.riponprinters.com, "Designing Your Mailpiece for Inkjet Addressing", available at http://www.riponprinters.com/tech---library/pdf/M7_TLines_Design_for_Inkjet.pdf (printed on Mar. 8, 2011).

www.malanenewman.com, "Graphic Design Terminology", website, available at http://www.malanenewman.com/graphic_design_terminology.html (printed on Mar. 8, 2011).

International Search Report and Written Opinion in PCT/US2010/053830 dated Dec. 27, 2010.

EPO Communication under Rule 71(3) EPC dated Jan. 10, 2011, with attached examiner's amendments, European Patent Appl. No. 07751211.9, Applicant Moore Wallace North America, Inc.

Second email to Mr. Qi Xue dated Mar. 9, 2011, with revised substitute Response to Second Office Action attached, Chinese Patent Application No. 200780006170.9, Applicant Moore Wallace North America, Inc.

International Search Report and Written Opinion in PCT/US2008/009911 dated Oct. 23, 2008.

International Search Report and Written Opinion in PCT/US2008/009901 dated Nov. 4, 2008.

European Patent Office Search Report & Written Opinion, EP 11 17 1598 dated Sep. 14, 2011.

Letter dated Nov. 2, 2011 to Arochi, Marroquin & Lindner, S.C.

Letter dated Nov. 9, 2011 from Arochi, Marroquin & Lindner, S.C.

Int'l. Search Report and Written Opinion dated Dec. 2, 2011 for International Application No. PCT/US2011/051975.

Second Office Action dated Apr. 6, 2011, with English translation attached, Chinese Patent Application No. 200780006171.3, Applicant Moore Wallace North America, Inc.

Letter to Mr. Qi Xue dated May 12, 2011, with claim amendments attached, Chinese Patent Application No. 200780006171.3, Applicant Moore Wallace North America, Inc.

Letter from Mr. Qi Xue dated Jun. 8, 2011, Chinese Patent Application No. 200780006171.3, Applicant Moore Wallace North America, Inc.

Office Action dated Dec. 27, 2011, for JP Patent Application No. 2008-556392, with English translation attached, Applicant, Moore Wallace North America, Inc., (5 pages).

EP Search Report and English translation, dated Jan. 5, 2012, for European Patent Application No. EP 11 18 4552, Applicant, Moore Wallace North America, Inc., (7 pages).

Office Action dated Jan. 24, 2012, for JP Patent Application No. 2008-556396, with English translation attached, Applicant, Moore Wallace North America, Inc., (7 pages).

Second Office Action dated Feb. 16, 2012, for CN Patent Application No. 2008-80113100.8, Applicant, Moore Wallace North America, Inc., (6 pages).

Letter dated Apr. 4, 2012 to Mr. Fujio Sasajima regarding Japanese Patent Application No. 2008-556392 (2 pages).

Email dated Apr. 20, 2012 to Mr. Fujio Sasajima regarding Japanese Patent Application No. 2008-556392 (1 page).

Letter dated Apr. 24, 2012 from Mr. Fujio Sasajima regarding Japanese Patent Application No. 2008-556392 (1 page).

Letter dated Apr. 19, 2012 to Mr. Qi Xue regarding Chinese Patent Application No. 2008801133100.8 (3 pages).

Letter dated May 3, 2012 from Mr. Qi Xue regarding Chinese Patent Application No. 2008801133100.8 (1 page).

Response, dated Apr. 11, 2012, to European Patent Office Search Report and Written Opinion, dated Sep. 9, 2011, (3 pages), European Patent Application No. 11171598.3, Applicant Moore Wallace North America Inc.

* cited by examiner

COMPOSITIONS COMPATIBLE WITH JET PRINTING AND METHODS THEREFOR

CROSS-REFERENCE TO RELATED APPLICATIONS

The present application claims the benefit of provisional U.S. Patent Application Nos. 60/965,361, filed Aug. 20, 2007; 60/965,634, filed Aug. 21, 2007; 60/965,753, filed Aug. 22, 2007; 60/965,861, filed Aug. 23, 2007; 60/965,744, filed Aug. 22, 2007; and 60/965,743, filed Aug. 22, 2007. All of the above listed applications are hereby incorporated by reference herein in their entireties.

BACKGROUND

Lithographic and gravure printing techniques have been refined and improved for many years. The basic principle of lithography includes the step of transferring ink from a surface having both ink-receptive and ink-repellent areas. Offset printing incorporates an intermediate transfer of the ink. For example, an offset lithographic press may transfer ink from a plate cylinder to a rubber blanket cylinder, and then the blanket cylinder transfers the image to a surface (e.g., a paper web). In gravure printing, a cylinder with engraved ink wells makes contact with a web of paper and an electric charge may assist in the transfer of the ink onto the paper.

Early implementations of lithographic technology utilized reliefs of the image to be printed on the plate such that ink would only be received by raised areas. Modern lithographic processes take advantage of materials science principles. For example, the image to be printed may be etched onto a hydrophilic plate such that the plate is hydrophobic in the areas to be printed. The plate is wetted before inking such that oil-based ink is only received by the hydrophobic regions of the plate (i.e., the regions of the plate that were not wetted by the dampening process).

Conventionally, all of these printing techniques have a similar limitation in that the same image is printed over and over again. This is due to the fact that conventional lithographic printing uses plates wherein each plate has a static (i.e., unvarying) image, whether it be a relief image or an etched hydrophobic image, etc. Gravure printing also uses a static image which is engraved in ink wells on a cylinder. There is a substantial overhead cost involved in making the plates that are used by a lithographic press or cylinders/cylinder sleeves used by a gravure press. Therefore, it is not cost effective to print a job on a lithographic or gravure press that will have few copies produced (i.e., a short-run job). Also, conventional lithographic and gravure presses have not been used to print variable data (e.g., billing statements, financial statements, targeted advertisements, etc.) except in cases where such presses have been retrofitted with inkjet heads, albeit at high cost and slower speeds. Typically, short-run jobs and/or jobs that require variability have been typically undertaken by laser (such as electrostatic toner) and/or ink jet printers.

Traditionally, many printed articles such as books and magazines have been printed using a process that involves a great deal of post-press processing. For example, a single page or set of pages of a magazine may be printed 5,000 times. Thereafter, a second page or set of pages may be printed 5,000 times. This process is repeated for each page or set of pages of the magazine until all pages have been printed. Subsequently, the pages or sets of pages are sent to post-processing for assembly and cutting into the final articles.

This traditional workflow is time- and labor-intensive. If variable images (i.e., images that vary from page-to-page or page set-to-page set) could be printed at lithographic image quality and speed, each magazine could be printed in sequential page (or page set) order such that completed magazines would come directly off the press. This would drastically increase the speed and reduce the expenses of printing a magazine.

Ink jet printing technology provides printers with variable capability. There are two main ink jet technologies: thermal, i.e. bubble jet, piezoelectric, and continuous. In each, tiny droplets of ink are fired (i.e., sprayed) onto a page. In a thermal jet printer, a heat source vaporizes ink to create a bubble. The expanding bubble causes a droplet to form, and the droplet is ejected from the print head. Piezoelectric technology uses a piezo crystal located at the back of an ink reservoir. Alternating electric potentials are used to cause vibrations in the crystal. The back and forth motion of the crystal is able to draw in enough ink for one droplet and eject that ink onto the paper. In a continuous ink jet system, the nozzles are continuously firing and an electrode associated with each nozzle deflects the drops to a gutter for collection when the nozzle is not to print. When a nozzle is to print the electrode is deactivated and the drop will pass to the substrate.

The quality of high speed color ink jet printing is generally orders of magnitude lower than that of offset lithography and gravure. Furthermore, the speed of the fastest ink jet printer is typically much slower than a lithographic or gravure press. Traditional ink jet printing is also plagued by the effect of placing a water-based ink on paper. Using a water-based ink may saturate the paper and may lead to wrinkling and cockling of the print web, and the web may also be easily damaged by inadvertent exposure to moisture. In order to control these phenomena, ink jet printers use certain specialized papers or coatings. These papers can often be much more expensive than a traditional web paper used for commercial print.

Furthermore, when ink jet technology is used for color printing, ink coverage and water saturation may be increased. This is due to the four color process that is used to generate color images. Four color processing involves laying cyan, magenta, yellow and black (i.e., CMYK) ink in varying amounts to make a color on the page. Thus, some portions of the page may have as many as four layers of ink if all four colors are necessary to produce the desired color. Additionally, the dots produced by an ink jet printer may spread and produce a fuzzy image. Still further, inks used in ink jet printers are extremely expensive as compared to inks used in traditional lithography or gravure printing. This economic factor alone makes ink jet technology unsatisfactory for the majority of commercial printing applications, particularly long run applications.

Laser printing has limited viability for high speed variable printing at present, because production speeds are still much slower than offset and gravure, and the material costs (e.g., toner, etc.) are extremely high compared to commercial offset or gravure ink prices. Laser color is also difficult to use for magazines and other bound publications, because the printed pages often crack when they are folded.

Printing techniques have been found to be useful in the production of other articles of manufacture, such as electrical components, including transistors and other devices. Still further, indicia or other markings have been printed on substrates other than paper, such as plastic film, metal substrates, and the like. These printing techniques may use those described above to print paper substrates, in which case these techniques suffer from the same disadvantages. In other cases flexography may be used, which, like lithography, requires the prepress preparation of plates.

SUMMARY OF THE INVENTION

In one embodiment, a method for high speed variable printing includes the step of jetting a gating agent composition onto a substrate in a pattern. The gating agent composition includes from about 0.05 to about 10% by weight of a blocking agent, up to about 3% by weight of a surface tension modifying compound, up to about 8% by weight of viscosity modifier such that the composition has a viscosity within the range of about 1 to 14 mPa s, and the balance of the gating agent composition includes a solvent. The gating agent has a static surface tension of less than about 40 dynes/cm, The method further includes the step of contacting both a first area having the gating agent jetted thereon and a second area not covered by the pattern of the gating agent with a printing agent such that a print image is formed substantially only in the second area. The pattern of the gating agent composition determines where the print image is formed.

Other aspects and advantages of the present invention will become apparent upon consideration of the following detailed description.

BRIEF DESCRIPTION OF THE DRAWINGS

Further features of the apparatus and methods for controlling application of a substance to a substrate, their nature, and various advantages will be more apparent from the following detailed description and the accompanying drawings, in which.

DETAILED DESCRIPTION

Figure 1:
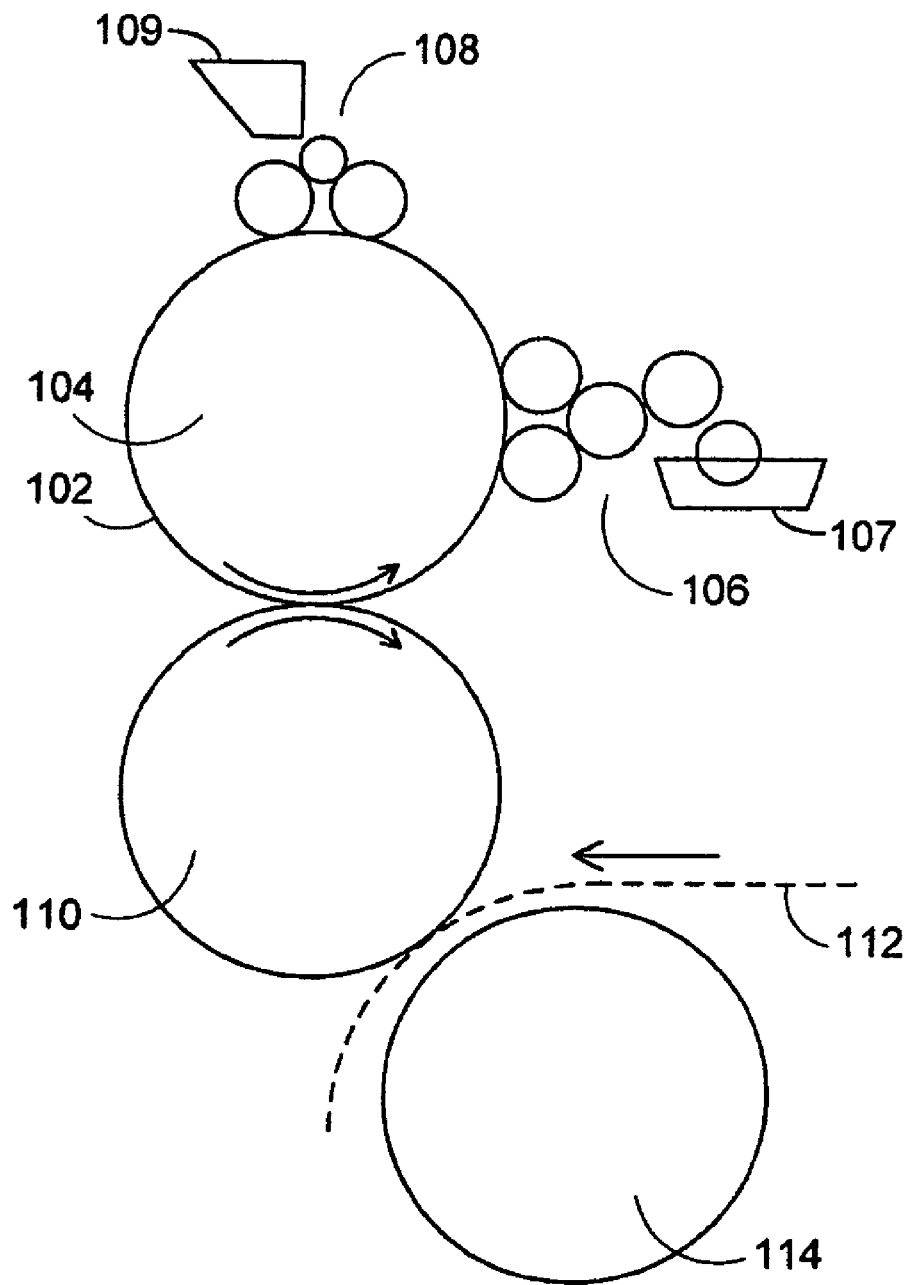
FIG. 1 is a side view of a prior art printing system.

FIG. 1 illustrates traditional offset lithographic printing deck 100. In a traditional lithographic process, the image to be printed is etched onto hydrophilic plate 102 to create hydrophobic regions on the plate which will be receptive to ink. Hydrophilic plate 102 is mounted on plate cylinder 104 and rotated through dampening system 106 and inking system 108. Dampening system 106 may include water supply 107, and inking system 108 may include ink source 109. The hydrophilic portions of plate 102 are wetted by dampening system 106. By using an oil-based ink, ink is only received by the hydrophobic portions of plate 102.

If a blanket cylinder is used, such as blanket cylinder 110, the inked image may be transmitted from plate cylinder 104 to blanket cylinder 110. Then, the image may be further transferred to web 112 (e.g., paper) between blanket cylinder 110 and impression cylinder 114. Using impression cylinder 114, the image transfer to web 112 may be accomplished by applying substantially equal pressure or force between the image to be printed and web 112. When a rubber blanket is used as an intermediary between plate cylinder 104 and web 112, this process is often referred to as "offset printing." Because plate 102 is etched and then mounted on plate cylinder 104, a lithographic press is used to print the same image over and over. Lithographic printing is desirable because of the high quality that it produces. When four printing decks are mounted in series, magazine-quality four color images can be printed.

Figure 2:
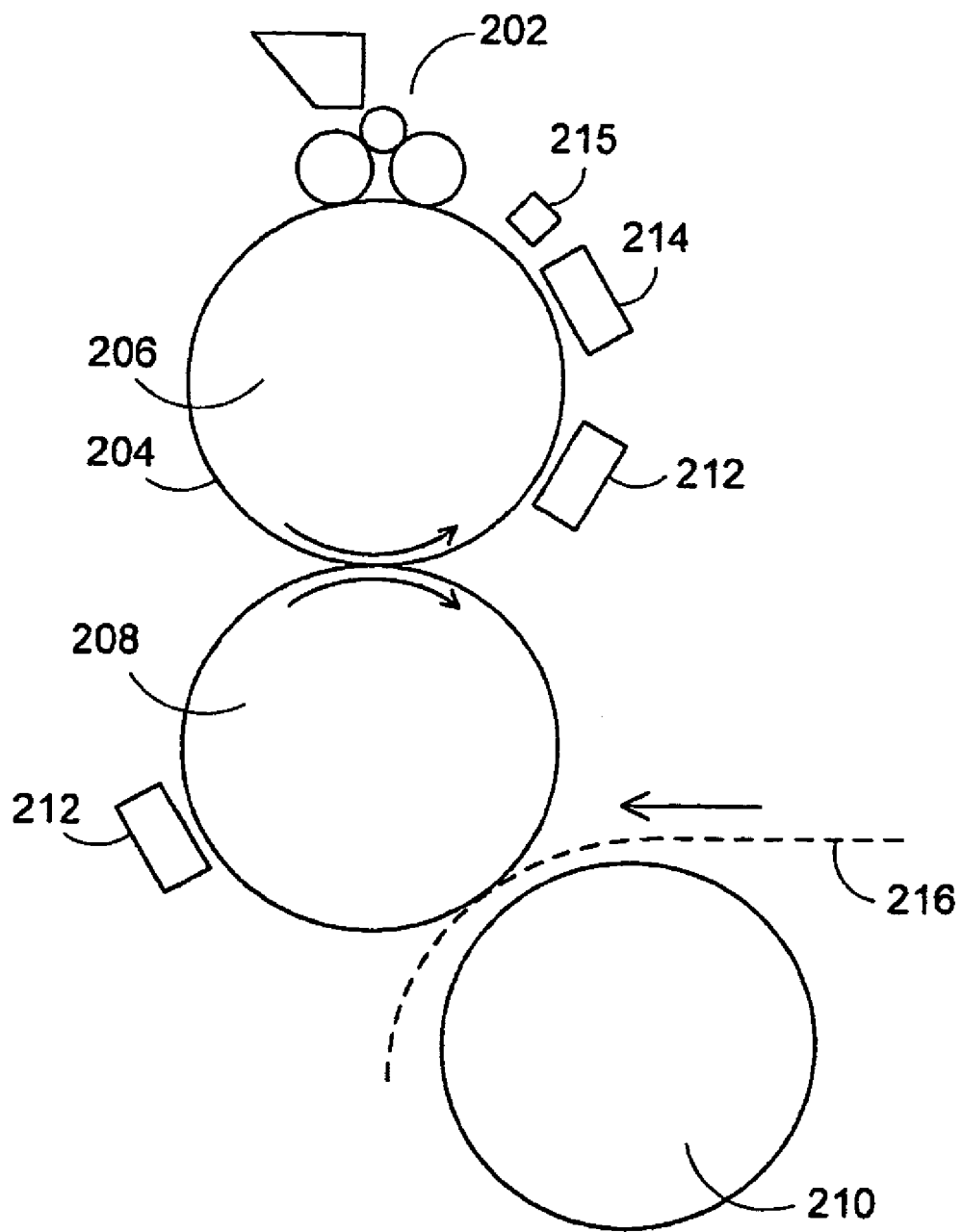
FIG. 2 is a side view of an illustrative embodiment of an apparatus for controlling application of a substance to a substrate.

In accordance with one aspect as depicted in FIG. 2, apparatus and methods for controlling application of a substance to a substrate involve the use of a gating agent that blocks the substance from or attracts the substance to the substrate.

Another aspect of the present disclosure is to provide a method for high speed variable printing using a gating agent applied transiently to the substrate. This method includes providing a substrate and applying to the substrate a gating agent composition capable of being jetted onto the substrate to enable the formation of images on the substrate. The gating agent composition includes from 0.05 to 3% by weight of a nonionic composition having a hydrophilic-lipophilic balance between about 15 and 30. The gating agent composition also includes up to 8% by weight of viscosity modifier such that the composition has a viscosity within the range of 1 to 14 centipoise. The balance of the gating agent composition comprises water. The gating agent composition does not contain a discernable amount of dye, pigment or other colorant and the gating agent has a surface tension of less than 40 dynes/cm.

In yet another aspect, apparatus for controlling application of a substance to a substrate involve the use of a gating agent that blocks the substance from the substrate. The apparatus includes a cartridge and a gating agent contained within the cartridge. The gating agent composition consists essentially of a nonionic surfactant, viscosity control agent, and water. The gating agent composition does not contain a discernable amount of dye, pigment or other colorant.

The apparatus and methods disclosed herein may utilize jetting technology to apply the gating agent directly to the substrate or to an intermediate surface. Any agent may be utilized that blocks the application of ink as desired. Because the embodiments disclosed herein comprehend the use of either (or both) blocking and transfer-aiding compositions, or one or more compositions that have both properties, reference will be made hereinafter to a gating agent that may have either or both of these capabilities with respect to a principal substance. Specifically, the gating agent may block transfer of all, substantially all, or some portions of the principal substance. The gating agent may alternatively, or in addition, aid in transfer of all, substantially all, or a portion of the principal substance, or may block some portion(s) and aid the transfer of other portion(s) of the principal substance. Examples of principal substances include, for example, lithographic inks, dyes, proteins (for example, antibodies, enzymes, prions, nucleic acids (for example, DNA and/or RNA oligonucleotides), small molecules (for example, inorganic and/or organic molecules), biological samples (for example, cell and/or viral lysates and fractions thereof), pharmaceuticals (including antibiotics and/or other drugs, and salts, precursors, and prodrugs thereof), cells (for example, prokaryotic, eubacterial, and/or eukaryotic cells), and metals (for example, silicon oxides, conductive metals and oxides thereof). In FIG. 2, the principal substance is an ink, the substrate a web of paper, and the selective portions of the principal substance are image areas.

FIG. 2 illustrates a printing deck 200, which may include inking system 202, plate 204, plate cylinder 206, blanket cylinder 208, and impression cylinder 210 as known in the lithographic printing industry. Plate 204 may be entirely hydrophilic (e.g., a standard aluminum lithographic plate). However, dampening system 106 of FIG. 1 has been replaced with cleaning system 212 and aqueous jet system 214 in FIG. 2.

Aqueous jet system 214 may contain a series of jet cartridges (e.g., bubble jet cartridges, thermal cartridges, piezoelectric cartridges, continuous inkjet systems, etc.). A bubble jet may emit a drop of liquid when excited by a heater. A piezoelectric system may eject a drop of liquid when excited by a piezoelectric actuator. The drop is emitted from a tiny hole in the jet cartridges. The cartridges may contain any number of holes. Commonly, jet cartridges can be found with six hundred holes, often arranged in two rows of three hundred. The aqueous jet units may be known print cartridge units such as those manufactured by HP, Lexmark, Spectra, Canon, etc. An example of a jet cartridge and jet head is described in Murakami et al. U.S. Pat. No. 7,240,998, which is incorporated herein by reference. Continuous systems are available from Kodak under the trade name Versamark.

The aqueous jet system 214 or any of the jet systems as disclosed herein may be used to emit a gating agent or a principal substance from the ink jet cartridge(s). The gating agent and principal substance can include aqueous or non-aqueous solutions. The aqueous solution may include water, a water-soluble organic compound, or a combination thereof. Suitable water-soluble organic components include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerin; glycols; glycol esters; glycol ethers; ketones, such as acetone, diacetone, or methyl ethyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof.

In embodiments as disclosed herein, the gating agent may contain from 0.05 to 3% by weight of one or more nonionic surfactants, such as poloxamer, ethoxylated acetylenediol or other ethoxylated surfactants. Such surfactants may contain both a hydrophilic group and a lipophilic group and have a hydrophilic-lipophilic balance between about 15 and 30. Preferably, the nonionic surfactants include 10 to 80% polyoxyethylene. The balance of the gating agent composition comprises water. The gating agent composition is used to block the application of ink or other substance to the substrate, the gating agent does not contain a discernable amount of dye, pigment or other colorant agent. The presence of coloring agent in the gating agent will prevent the gating agent from forming colorless backgrounds when used in the printing context.

The poloxamer surfactant suitable for use can be represented by the formula $HO(CH_2CH_2O)_x(CH_2CHCH_3O)_y(CH_2CH_2O)_zH$ wherein x, y and z represent integers from the range from 2 to 130, especially from 15 to 100, and x and z are identical but chosen independently of y. Among these, there can be used poloxamer 188 wherein x=75, y=30 and z=75, which is obtainable under the trade name Lutrol® F 68 (alternatively Pluronic® F 68) from BASF, poloxamer 185 wherein x=19, y=30 and z=19 (Lubrajel® WA from ISP), poloxamer 235 wherein x=27, y=39 and z=27 (Pluronic® F 85 from BASF), poloxamer 238 wherein x=97, y=39 and z=97 (Pluronic® F 88 from BASF), Pluronic® 123 from BASF, and/or Pluronic® 127, poloxamer 407, from BASF for which x=106, y=70, and z=106. Additionally, poloxamer 101, 108, 124, 181, 182, 184, 217, 231, 234, 237, 282, 288, 331, 333, 334, 335, 338, 401, 402, and 403, respectively can be included in the gating agent, to name a few.

The ethoxylated acetylenediol suitable for use include Air Products' Surfynol® 400 series surfactants: Surfynol® 420, 440, 465, and 485, respectively. The Surfynol® 400 series surfactants are produced by reacting various amounts of ethylene oxide with 2,4,7,9-tetra-methyl-5-decyne-4,7-diol (Air Products' Surfynol® 104), a nonionic molecule with a hydrophilic section in the middle of two symmetric hydrophobic groups. A further suitable surfactant includes SILWET™ 7200, a siloxane block polymer, available from OSi Specialties, Inc. (Danbury, Conn., formerly Union Carbide Organo Silicon Products, Systems and Services). Another suitable gating agent component is BASF's Sokalan®, maleic acid/olefin copolymer. Other surfactants may include polyethyleneimine (PEI) having a molecular weight of around 1200, ethoxylated PEI having a molecular weight around 50,000, hexadecyl trimethylammonium bromide (CTAB), polyoxyalkylene ether, poly(oxyethylene)cetyl ether (e.g., Brij® 56 or Brij® 58 from Atlas Chemicals).

In embodiments as disclosed herein, the gating agent composition may also include a viscosity modifying agent to achieve a viscosity within the range of 1 to 14 centipoise (cP). More preferably, the viscosity is set to 2 to 8 cP, and most preferably to 3 to 5 cP. The viscosity agent may include polyethylene glycol, propylene glycol, cellulosic materials (e.g. CMC), xanthan gum, or Joncryl® 60, Joncryl® 52, Joncryl® 61, Joncryl® 678, Joncryl® 682 solution polymers from BASF, to name a few.

In some embodiments, the gating agent composition may further include a surface tension modifier to reduce spreading. Preferably, surface tension is set to less than 40 dynes/cm. More preferably, a surface tension of less than 35 dynes/cm is attained. The surface tension modifier may include poloxamer (e.g., BASF's Pluronic®) or Air Products' Surfynols® (e.g. Surfynol® 400 series surfactants), among others.

In other embodiments, a litho ink modifier is included in the gating agent formulation. The litho ink modifier alters a property or properties of the underlying blocked ink or other principal substance. The litho ink modifier may include magnesium carbonate, calcium carbonate, mineral oil, liquid asphaltum, powdered asphaltum, burnt plate oils, flash oil, cobalt, soybean oil, and lump rosin, among others.

In yet other embodiments, the gating agent composition includes a receiving surface modifier. The receiving surface (e.g. paper) modifier facilitates the transfer of blocked ink or other principal substance to the receiving surface. The receiving surface modifier may include surface dusting powders such as metal powders, and cork powder, to name a few. Other examples of surface modifying compounds include polyethyleneimine and ethoxylated polyethyleneimine (10 to 80% ethoxylation).

Additional contemplated components in the gating agent include a solvent, a preservative, an anticurl agent, a gating agent anchor, a humectant (e.g. propylene glycol), an antiseptic agent, a biocide, a colorant, a scent, a surfactant, a polymer, a defoaming agent, a salt, an inorganic compound, an organic compound, water, a pH modifier, and any combination thereof.

The aqueous jet system 214 may be used to "print" or jet a negative image of the image to be printed, or any portion thereof, on plate cylinder 206. For example, an image controller may receive image data from a data system. The image data may represent the image to be printed or the negative image to be printed. The image data may include variable image data that changes relatively frequently (e.g., every printed page), semi-fixed image data that changes less frequently (e.g., every 100 printed pages), fixed image data that remains static, and any combination of variable, semi-fixed, and fixed image data. Some or all of the image data may be stored as binary data, bitmap data, page description code, or a combination of binary data, bitmap data, and page description code. For example, a page description language (PDL), such as PostScript or Printer Command Language (PCL), may be used to define and interpret image data in some embodiments. The data system may then electronically control aqueous jet system 214 to print in aqueous solution the image (or the negative image) represented by some or all of the different types of image data (or any portion thereof) onto plate cylinder 206. The negative image may be an image of every portion of the paper that is not to receive ink. Thus, after a point on plate cylinder 206 passes aqueous jet system 214, that point will only receive ink from inking system 202 if a drop of aqueous solution was not placed at that point. In some embodiments, a vacuum source or heat source 215 may be positioned next to or near aqueous jet system 214. As plate cylinder 206 completes its revolution, after passing the image to blanket cylinder 208, it passes through cleaning system 212, which may remove ink and/or aqueous solution residue so that plate cylinder 206 may be re-imaged by aqueous jet system 214 during the next revolution (or after a certain number of revolutions).

In some embodiments, plate cylinder 206 may have all of the static data for a particular print job etched onto plate 204 by traditional lithographic techniques. Aqueous jet system 214 may then be used to image only variable portions of the job represented by the variable or semi-fixed image data on specified portions of plate 204. In other embodiments, plate 204 may not be used. Instead, as is understood in the art, the surface of plate cylinder 206 may be treated, processed, or milled to receive the aqueous solution from aqueous jet system 214. Additionally, plate cylinder 206 may be treated, processed, or milled to contain the static data and be receptive to the aqueous solution to incorporate variable data. In these and any other embodiments herein, blanket cylinder 208 may be eliminated entirely, if desired, by transferring the image directly to web 216.

As described above, the gating agent may be applied using one or more jet heads either to a plate or directly to a blanket cylinder, then ink may be applied in a non-selective fashion to the plate or blanket cylinder, and then the ink may be transferred from the image areas on the plate or blanket cylinder to the web of paper. In the event that the gating agent and the ink are applied directly to the blanket cylinder, the plate cylinder need not be used. Particular printing applications that may benefit include static print jobs (particularly, but not limited to, short runs), or variable or customizable print jobs of any size, for example, targeted mailings, customer statements, wallpaper, customized wrapping paper, or the like.

The gating agent may be applied as, for example, an aqueous fluid by being selectively sprayed directly onto the substrate or onto an intermediate surface or directly onto the principal substance using a jet device or other precisely controllable spraying or application technology. An aqueous fluid may generally have a low viscosity and a reduced propensity to form clogs, and is therefore advantageous for use with an jet head. However, the gating agent may also be applied using jet technology in a form other than an aqueous fluid. Examples include UV curable systems and non aqueous siloxane systems Further, the gating agent is not limited to being a fluid at all and may be applied as a solid, for example as a thin film, a paste, a gel, a foam, or a matrix. The gating agent could comprise a powdered solid that is charged or held in place by an opposite electrostatic charge to prevent or aid in the application of the principal substance.

As an example, a liquid gating agent in the form of a solvent may be applied by one or more jet heads to a plate and a powdered ink colorant dispersible in the solvent may be deposited over the entire surface of the plate to form a liquid ink in situ in the jetted areas. Powder in the non-jetted areas may be removed (e.g., by inverting the plate so that the powder simply falls off the plate, by air pressure, centrifugal force, etc), thereby resulting in inked and non-inked areas. The solvent may then be jetted onto the areas to be imaged to form liquid ink in such areas, and the electrostatic charge removed so that the powder in the non-wetted areas can be removed. In either event, the resulting image may thereafter be applied to a substrate, for example a web of paper.

Any of the systems described herein may be modified to allow formation of different drop sizes of gating agent. In general, a higher resolution grid, that is a grid with 300 dpi or greater, along with matched drop size improves blocking or transfer/collection of the principal substance, such as an ink. Also, as the dpi of the grid increases, the size of the drops that are most efficacious general are smaller. A larger drop size is more susceptible to forced wetting of areas to be imaged. This forced wetting can result from merging of adjacent jetted drops when the image is transferred between surfaces (such as in the nip area between a plate and blanket) and can cause a decrease in image quality due to a reduction in print density. Such forced wetting can be minimized by the addition/removal of one or more constituents and/or changing or adjusting one or more physical properties of the gating agent. For example, reducing certain surfactants may reduce ghosting while utilizing, adding, and/or substituting other surfactants may also improve image quality. Alternatively, one could apply an electrostatic charge to a cylinder that is opposite in the polarity to the charge of the gating agent applied to the cylinder. The resulting electrostatic attraction may reduce or eliminate forced wetting.

The gating agent may be used to accomplish blocking or aiding the application of the principal substance by removing or blocking or applying the principal substance in image or non-image areas, removing an aiding agent in non-image areas, preventing the application of the principal substance in certain or all areas, changing the physical or chemical properties of the gating agent or principal substance (such as changing the viscosity or surface tension of the gating agent or principal substance) to affect the application of the gating agent or principal substance, any combination of the foregoing, or by any other suitable method.

In yet other embodiments, the amount of the principal substance applied to the substrate may vary through use of a gating agent in the form of a barrier or a blocking agent with barrier qualities. In such embodiments, the application of the principal substance to the substrate may be blocked either completely or partially, so that the principal substance may be applied in intermediate levels to the substrate, as the barrier or the blocking agent with barrier qualities allows, effectuating a density gradient of the principal substance on the substrate in accordance with desired intermediate levels of principal substance application.

Further embodiments include the blocking agent being applied selectively to the principal substance on the surface or other substrate, before or after application of the principal substance to the surface. For example, the blocking agent may include a material dispersed within it that is resistant to affinity with the particular embodiment of the principal substance used. The blocking agent may then be applied to the surface in non-image areas, with the material dispersed within the blocking agent absorbed into and/or received and retained on the surface. The surface may then be passed adjacent a further surface having the principal substance disposed thereon, and the principal substance may be transferred to the first-named surface only in those areas which do not contain the blocking agent, as the material dispersed within the blocking agent resists the application of the principal substance to the non-image areas.

Properties of the gating agent and of the print medium (e.g., using bond paper, gloss paper, or various coating techniques) may be varied to achieve a desirable interaction between the protective negative image that is printed with the aqueous jet system and the print medium. For example, if image sharpness is desired, it may be beneficial to choose a gating agent that will not be absorbed at all by the print medium. However, if some transfer of ink is desirable even from the areas covered with the output of the aqueous jet system, it may be beneficial to use a print medium that quickly absorbs the aqueous solution so that some ink transfer is also able to occur from the covered areas. Still further, increasing the viscosity of the gating agent and/or increasing the surface tension thereof, and/or using a supporting agent and/or system for non-image and image areas, respectively, such that the boundaries between image and non-image areas are maintained can reduce spreading, thus improving quality. In particular, manipulating the viscosity of the gating agent to 1 to 14 cP prevents flooding, that is forced wetting that loses the image, including ragged edges and lines, as well as minimizes ghosting, Ghosting may occur when ink migrates to a non-image area of a cylinder or when residual ink or gating agent remains on a cylinder from a prior impression. It is important that the viscosity of the gating agent be maintained at a value less than 14 cP to allow for the gating agent to be emitted from the jet head. Other chemical and/or materials science properties might be utilized to reduce or eliminate this effect. The gating agent may also include a thixotropic fluid that changes viscosity under pressure or agitation. Manipulating the surface tension of the gating agent can also reduce spreading.

Still further, surfactant block copolymers having various properties may be used with imaging cylinders having various material properties to achieve an imaging cylinder that has a selectively oleophilic and hydrophilic surface. The physical bond created between the surfactant and the imaging cylinder's surface allows the imaging cylinder to repeat the same image multiple times or to selectively vary the image in any given rotation of the imaging cylinder. By taking advantage of the material properties of the imaging cylinder and the block copolymer surfactants, a durable, yet variable, imaging system having the quality of known lithographic printing techniques may be achieved.

Another process variable is the substrate itself. In the case of a paper substrate, a conventional coated stock of appropriate size, weight, brightness, etc. may be used. One or more coatings, such as clay, may be applied thereto to delay/prevent absorption of principal substance and/or gating agent. In the case of other substrates, such as a printing blanket, a printing plate, a printing cylinder, a circuit board, a plastic sheet, a film, a textile or other sheet, a planar or curved surface of a wall, or other member, etc., the surface to which the principal substance is to be applied may be suitably prepared, processed, treated, machined, textured, or otherwise modified, if necessary or desirable, to aid in and/or block transfer of portions of the principal substance, as desired.

The types and/or physical characteristics and/or chemical compositions of the ink(s) or other principal substance(s) may be selected or modified to obtain desired results. For example, by controlling the surface tension of the ink, color-to-color bleed and showthrough on the opposite side of the paper can be eliminated. As a further example, one or more ink(s) used in waterless printing applications may be employed together with jetted gating agent (whether the latter is aqueous or non-aqueous) to block or promote transfer of ink from plate to paper. In the case of the use of waterless printing ink(s) with an aqueous gating agent, the composition of the gating agent may be adjusted in view of the lipophilic characteristics of such ink(s) so that the gating agent has a molecular structure that attracts and/or repels the ink(s) as necessary or desirable. Alternatively, jetted gating agent applied initially to a hydrophilic plate may include one or more hydrophilic components that bond with the plate and one or more other components that bond with or repel ink molecules.

As a still further example, a phase change of the gating agent, or the principal substance, or both, may be employed to prevent and/or promote substance blocking or transfer/collection. For example, gating agent may be selectively jetted onto a surface, such as a plate, and principal substance may be applied to the surface having the gating agent applied thereto, whereupon the portions of the principal substance that contact the jetted gating agent may be converted to a gel or a solid. Alternatively, the principal substance may be applied in an indiscriminate (i.e., non-selective) fashion to the plate and the gating agent may thereafter be selectively applied to portions of the plate that are not to be imaged (i.e., non-image areas), whereupon the principal substance in the jetted portions is converted to a gel or solid. Still further, a two (or more) component gating solution could be used wherein the components are individually selectively applied in succession where each is individually jettable, but which, when applied in the same location, react similarly or identically to an epoxy-type and other chemical bonds such as covalent, ionic bonding, etc., and physical interactions such as hydrogen bonding, Van der Waals forces to promote advantageous gating characteristics. The principal substance, such as ink may be applied before or after one or more of the gating agent components are applied. In any of the foregoing examples, a substrate (such as a web of paper) may be imaged by the plate.

Figure 3:
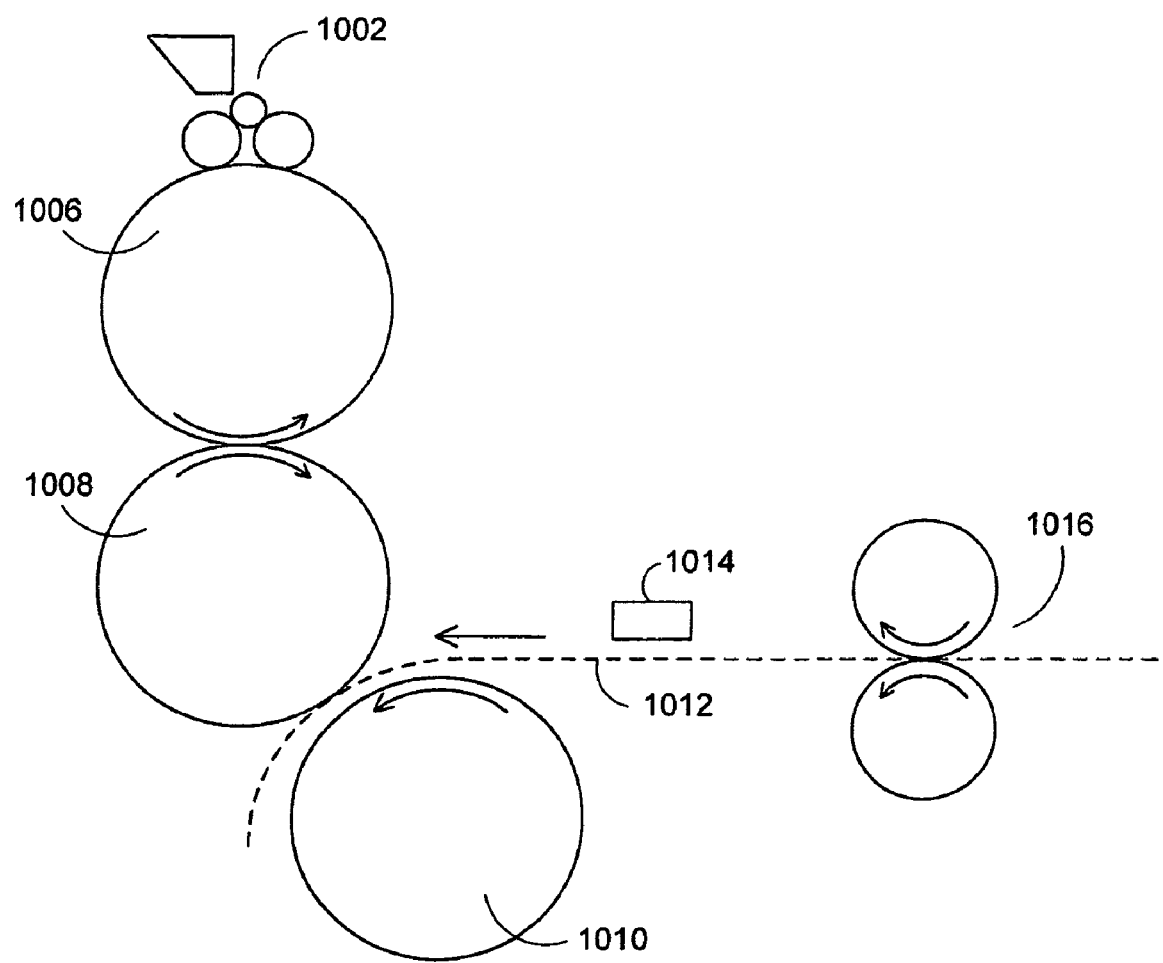
FIG. 3 is a side view of an illustrative embodiment of an apparatus for controlling application of a substance to a substrate.
Figure 4:
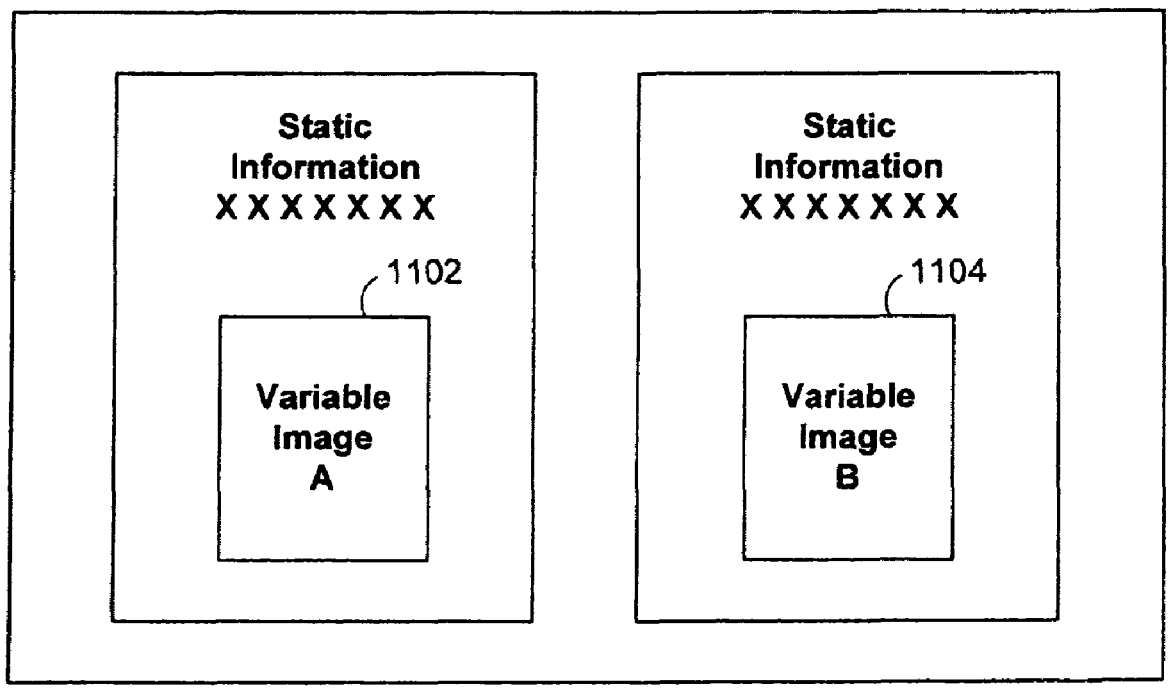
FIG. 4 is an illustration of possible output in accordance with the apparatus shown in FIG. 3.

FIG. 3 illustrates another alternative embodiment. FIG. 3 shows lithographic deck 1000 as known in the art (e.g., inking system 1002, plate cylinder 1006, blanket cylinder 1008, and impression cylinder 1010). However, upstream from lithographic deck 1000, coating system 1016 and aqueous jet system 1014 have been installed. In embodiments like that shown in FIG. 3, a standard lithographic plate may be etched with the static information for a given job or may be completely ink receptive. In one embodiment, a portion of the plate may be reserved for variable information (e.g., plate 1100 may include one or more variable image boxes, such as boxes 1102 and 1104, as shown in FIG. 4). The portion of the lithographic plate that corresponds to the variable image boxes may be formed to be ink receptive over the entire surface of the variable image boxes (i.e., when the variable image box portions of the lithographic plate passes the inking system, the entire rectangular areas will accept ink). In other embodiments, the entire plate may be receptive to ink and the aqueous jet system can provide blocking fluid across the entire web 1012.

To generate the variable image, a negative image of the variable image may be applied in gating agent by aqueous jet system 1014 directly onto web 1012. Before web 1012 reaches aqueous jet system 1014, web 1012 may be in some embodiments, be coated to prevent web 1012 from absorbing the gating agent. In other embodiments, the web 1012 remains uncoated so that the gating agent applied by the aqueous jet system 1014 can apply the image to the entire web 1012. Thus, when the portion of web 1012 to receive the variable image makes contact with the portion of blanket cylinder 1008 transferring the ink for the variable image, web 1012 selectively receives the ink only in the areas not previously printed on by aqueous jet system 1014. The standard lithographic deck operates as though it is printing the same image repeatedly (e.g., a solid rectangle). However, web 1012, which is first negatively imaged by aqueous jet system 1014, only selectively receives the ink in the solid rectangle on blanket cylinder 1008 to create the variable image on web 1012. Coating system 1016 may be an entire deck of its own for applying the coating. Alternatively, coating system 1016 may be any suitable alternative for applying a coating to web 1012 to reduce its ability to absorb the gating agent. For example, coating system 1016 may include a sprayer that sprays a suitable solution onto web 1012. The solution may prevent web 1012 from absorbing all or some of the gating agent.

In any of the foregoing embodiments, a blanket and plate cylinder combination may be replaced by a single imaging cylinder and vice versa. Further, one or more of the aqueous jet systems, cleaning systems, stripping systems, and vacuum or heating systems in embodiments may be electronically controlled via data system.

Still further, the nip pressure of the roller(s) and the compressibility characteristic of the roller(s) at which the principal substance is applied to the substrate may be varied to control image quality as well as the compressibility characteristic of the nip roller. Also, rolls or cylinders having a textured surface may be used to control the application of the principal substance to the substrate, as desired. Still further, or in addition, the volume of the drops of gating fluid could be adjusted to control the amount of ink transferred into each cell, thereby affecting grayscale.

A still further option is to modulate/control the temperature of one or more process parameters. For example, one might elevate the temperature of the gating agent upon application thereof to a surface to improve adherence and facilitate dispensing thereof. Alternatively, or in addition, the surface may initially be heated during application of gating agent to control adhesion, drop shape/size, and the like, and/or the surface may be chilled at some point in the process once the gating agent is applied thereto so that the viscosity of the gating agent is increased, thereby reducing spread of the gating agent into non-wetted areas.

One could further use multiple different liquids dispensed by separate jet devices that, when applied together, create a gating agent that has improved adherence and/or viscosity and/or other desirable characteristic. The liquids may be applied at the different or same temperatures, pressures, flow rates, etc.

Yet another embodiment comprehends the use of two or more arrays or ink jet heads for selectively applying gating agent alone, or for selectively applying gating solution to one or more areas of a surface and, optionally, ink to one or more remaining areas of the surface, wherein one or more of the arrays can be independently removed and switched over while the press is running, or, reconfigured (in terms of position) for the next succeeding job (e.g., where regional customization is required).

Due to variations in ink tack from print unit to print unit, one may undertake a successive modification of gating agent characteristics from unit to unit to effectively optimize ink transfer by each unit. Yet another modification involves the use of a phase change material to build up a printing surface.

In yet other embodiments, the gating agent(s) used to control application of the principal substance to the substrate may be combinations of blocking and aiding agents. In one example, the principal substance is disposed on a surface and is covered in non-image areas by a blocking agent that blocks application of the principal substance to the substrate. In image areas, the principal substance is covered by an aiding agent that tends to establish a bond with the principal substance to aid in application onto the substrate. Alternately, the gating agent(s) may be disposed on the surface and covered by the principal substance. In one example, a lipophilic blocking agent is selectively disposed on non-image areas of the surface and a hydrophilic aiding agent is selectively disposed on image areas of the surface. The principal substance is then disposed on top of the layer created by both gating agents. The layer of both gating agents having a consistent height on the first surface may prevent migration between the principal substance and the aiding agent. As the surface is moved adjacent the substrate, the blocking agent keeps the principal substance from being applied to the substrate, while the aiding agent allows application of the principal substance to the substrate.

In alternate embodiments, the surface may be a lithographic plate, cylinder, or the like having a portion that may be used for controlling application of the principal substance to the substrate by applying variable configurations of the principal substance to the substrate. In such embodiments, variable symbology, encoding, addressing, numbering, or any other variable tagging technique may be utilized in the portion of the first surface reserved for controlling application of the principal substance. The principal substance is first disposed on the first surface indiscriminately. Before the substrate is passed near the first surface for application of the principal substance, a blocking agent is selectively applied to the substrate in an area where the reserved portion of the first surface will subsequently be moved adjacent the substrate so as to allow the desired configuration, or image, of the principal substance to be applied thereto. In a more general embodiment, the substrate may be brought adjacent one or more than one surface having similar or differing principal substances disposed thereon, wherein blocking and/or aiding agents are selectively transferred to the substrate from the surfaces in the reserved portion. In one embodiment, a magnetic ink is transferred from one of these surfaces to the substrate (e.g., a paper web). One or more non-magnetic inks may be transferred from the same surface or from one or more additional surfaces. A gating agent may be used to either block or aid application of the magnetic ink to the paper web in a desired configuration in the reserved portion thereof using any of the techniques for using blocking and aiding agents described above. The result is a printed paper web having markings of magnetic ink (such as a MICR marking or other encoded information) that may be changed from impression-to-impression. One example is applying encoded RFID circuits as part of the variable print process. This eliminates the need for post printing programming.

According to a still further embodiment, the gating agent is selectively applied to a receiver surface by one or more jet heads and attracts or blocks an intermediate fluid, such as traditional fountain solution, which is applied indiscriminately to the receiver surface but gated by the gating agent, such that the fountain solution adheres selectively to the receiver surface prior to application of ink thereto. In this embodiment, the gating solution is formulated to interact with and control the fountain solution, as opposed to controlling the ink. Additional embodiments may neutralize or compromise the fountain solution, or selectively enable removal thereof from the receiver surface. In more general terms, these embodiments comprehend the use of a selectively applied gating solution together with indiscriminately applied fountain solution and ink wherein the gating agent controls where the fountain solution is maintained.

As mentioned above, the gating agent may include one or more surfactants or may be temperature or vacuum controlled to produce drop size and viscosity characteristics that are favorable to produce a high quality image. However, the quality of an image may also be affected by a phenomenon known to those of skill in the art as ghosting, which may be an especially serious problem if consecutive images are different.

Ghosting may be diminished by assuring that the image and non-image areas are clean of ink and/or any gating agents between successive impressions. Cleaning the cylinder after every application of ink therefrom as described with respect to any of the cleaning systems discussed hereinabove is one way to assure that the cylinder is clean. The composition of the gating agent may also be engineered to reduce ghosting by promoting more complete cleaning by the cleaning system.

Another approach to diminish ghosting is to inhibit the migration of ink from the image areas to the non-image areas on the cylinder. A lipophilic solution may be precisely applied to the image areas to attract ink thereto and inhibit migration therefrom. Independently, or in combination with the lipophilic solution, a lipophobic solution may be precisely applied to the non-image areas of the cylinder to inhibit migration of ink thereto.

One of the advantages of using the concepts for processing variables and static print jobs as have been described herein is the inherent speed associated with a conventional lithographic press. In fact, press speed compared to a conventional lithographic press is limited by the speed at which an image area can be created, which in turn depends upon the method of creation of the image area. Such methods have been described herein to include application of a gating agent to create the image area. The gating agent may be a lipophilic or hydrophilic solution, or some other solution that may have an electrostatic charge applied thereto. The gating agent may also be an electrostatic charge applied to a portion of a cylinder. The maximum speed at which any of these gating agents is applied to one or more cylinders of the press may limit the speed of operation of the press.

For most operating conditions wherein an ink jet cartridge is utilized in normal ink jet printing, the ejection of a droplet from the cartridge is considered to be an instantaneous event that produces a spot of ink of predetermined size on a target substrate. In reality, the ejection of a droplet from an ink jet cartridge is not an instantaneous event, but is in fact a transient event, having a beginning, a middle, and an end. If a target substrate is moving at a high speed, the ink droplet may strike the substrate to form a spot of ink having a tail trailing the spot in a direction opposite to the direction of travel of the substrate. This phenomenon, known as tailing, is a direct result of the transient nature of the droplet generation. Tailing at high press speeds may limit the effective speed of the press due to print quality concerns. It has been found, however, that certain gating agents, when used with particular jet cartridges may inhibit or alleviate the tailing of the ejected droplets, thereby removing this effect as a limiting factor on maximum press speed.

In another embodiment, an aqueous jet system may print or jet an aqueous solution or other composition that has a multifunctional potential onto a pattern substrate. In one embodiment, for example, the composition may have a bifunctional potential, though any number of functionalities are contemplated herein. For example, the multifunctional composition may include one or more compounds each having a multifunctional potential or a plurality of compounds each having monofunctional potentials. A functional potential may include, for example, a function portion of a compound that may be attributable to a specific chemical moiety and/or structural region of the compound that confers attachment and/or repellant properties to the compound, such as, for example, a hydrophilic region, a lipophilic region, a receptor/recognition region (for example, a paratope), an ionic region, and others known in the art. In the present embodiment, one functionality confers attachment capabilities to the pattern substrate, and a second confers attachment properties to one or more principal substances that may be applied thereto.

In another embodiment, a multifunctional composition may include more than one multifunctional compound where each species of multifunctional compound has at least one functionality in common with the other multifunctional compounds and at least one functionality that differs from the other multifunctional compounds. In this example, a first multifunctional compound and a second multifunctional compound may each be printed onto a similar pattern substrate though the second functionalities of the first multifunctional compound and the second multifunctional compounds may have different specificities for a principal substance that can be attached to either the first or the second multifunctional compound, assuming the principal substance only reacts with one type of functionality. In another embodiment, compounds having monofunctional potentials may interact to form complexes having multifunctionality similar to that of single multifunctional compounds. In this embodiment, the monofunctional compounds may be included in a single composition that is deposited on the pattern substrate at one time, included in separate compositions deposited simultaneously, or may be contained in separate compositions that are deposited on the pattern substrate sequentially.

One example of a multifunctional compound contemplated herein includes a compound having one functionality that may be hydrophilic and a second functionality that may be lipophilic. The multifunctional composition may be jetted using in a desired pattern onto a substrate having either hydrophilic or a lipophilic surface, whereby like functionalities amongst the surface and the composition would associate to attach the composition to the surface and the opposite functionality of the composition would be repelled from the surface to render a pattern of the composition attached thereon.

A second composition, for example, the principal substance, having a like functionality (for example, hydrophilic or lipophilic) or otherwise attracted selectively to the second functionality of the multifunctional composition, which is not attached to the surface, and that is repulsed from or otherwise not attachable to the exposed surface of the substrate may be added to the surface by jetting, dipping, spraying, brushing, rolling, or any other manner known to a skilled artisan. Addition of the principal substance may render a pattern of the principal substance corresponding to that of the multifunctional composition, such that the principal substance is only attached to the surface via the second functionality of the multifunctional composition. It is further contemplated that after the application of the principal substance, one or more additional steps may be performed, including, for example a cleaning step, to ensure regiospecific attachment of the principal substance only to the second functionality of the multifunctional composition. Another contemplated step similar to the cleaning step includes a sterilization step. The principal substance may then be transferred to a second substrate, including, for example, an intermediate roller from which an image will be transferred to the print medium, or directly to the print medium to render the desired print image in a highly accurate and clean manner. In this way, selected patterns may be jetted onto a substrate using a multifunctional composition to which a principal substance is subsequently attached that then may be transferred to and immobilized permanently or transiently on a print medium.

Examples of multifunctional compounds contemplated herein include polymers, having at least one hydrophilic portion and at least one lipophilic portion, such as a poloxamer or acetylenediol ethoxylated mentioned above. Additional examples include materials associated with the formation of self-assembled monolayers, such as alkylsiloxanes, fatty acids on oxidic materials, alkanethiolates, alkyl carboxylates, and the like. Other multifunctional compounds known to one skilled in the art are contemplated in the present disclosure.

The apparatus and methods disclosed herein are also relevant in other industries and other technologies, for example, textiles, pharmaceuticals, biomedical, and electronics, among others. Variably customizable graphics or text, or a principal substance having enhanced sealing properties or water or fire resistance may be selectively applied to webs of textiles such as may be used to manufacture clothing or rugs. In the pharmaceutical industry, the principal substance may be a drug, a therapeutic, diagnostic, or marking substance other than an ink, or a carrier for any other type of substance. In biomedical applications, for example, the principal substance may be a biological material or a biocompatible polymer. In electronics applications, the principal substance may be an electrically conductive or insulative material that may be selectively applied in one or more layers on the substrate. Other electronic applications include production of radio frequency identification ("RFID") tags on articles. Other industries may also benefit from selective application of a principal substance to a substrate. For example, the principal substance may be a thermally conductive or insulative material selectively applied over components of an item of manufacture, for example, a heat exchanger, a cooking pan, or an insulated coffee mug. The principal substance may also be a material with enhanced absorptive, reflective, or radiative properties, some or all of which may be useful in other items of manufacture, for example, when the principal substance is selectively applied to components of an oven, a lamp, or sunglasses. Still further uses for the principal substance may include customizable packaging films or holograms (via selective filling of refractive wells prior to image forming). Moreover, the technology could be applied to fuel cell manufacturing and the principal substance may include functional polymers, adhesives and 3-D interconnect structures. In applications for the manufacture of micro-optical elements, the principal substance could be an optical adhesive or a UV-curing polymer. Yet a further application may be display manufacturing wherein the principal substance is a polymer light-emitting diode material. Further, in a specific application, the apparatus and high speed variable printing methods disclosed herein may be used in a number of lithographic applications. For example, the disclosed apparatus and methods may be ideal for high-quality one-to-one marketing applications, such as direct mailing, advertisements, statements, and bills. Other applications are also well-suited to the systems and methods disclosed herein, including the production of personalized books, periodicals, publications, posters, and displays. The high speed variable printing systems and methods disclosed herein may also facilitate post-processing (e.g., binding and finishing) of any of the aforementioned products.

Figure 5:
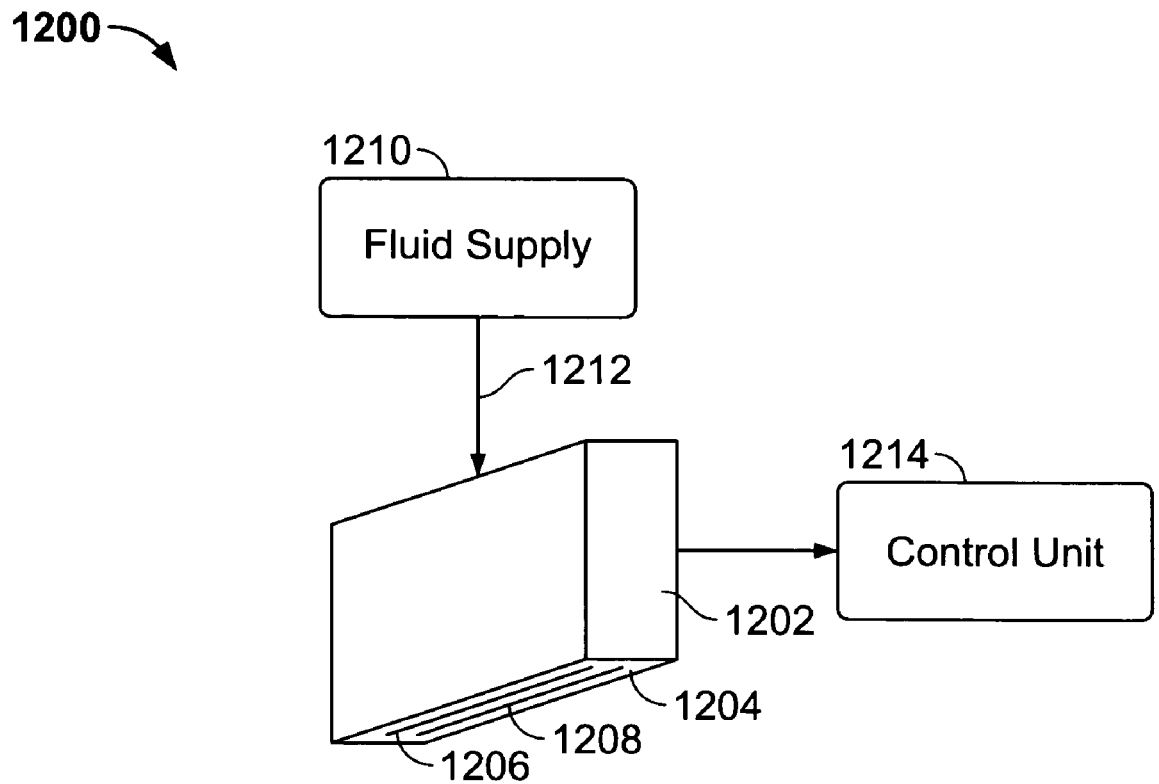
FIG. 5 is a schematic illustration of one embodiment of the device of the present invention.
Figure 6:
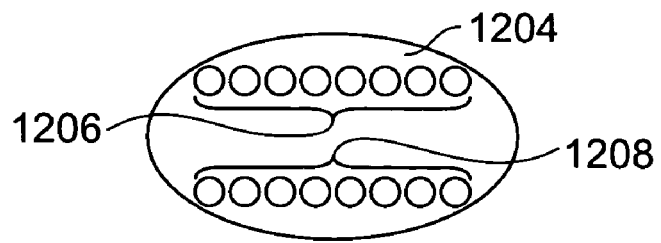
FIG. 6 is a close up view of a portion of the device of FIG. 5.

Referring to FIGS. 5 and 6, the gating agent may be jetted using a device 1200. The device 1200 has a housing 1202 with a surface 1204. The surface 1204 has a plurality of jet nozzles 1206 and 1208. In FIGS. 5 and 6, two rows of nozzles 1206 and 1208 are shown however, the device can have one or more rows of nozzles depending on the needed resolution. The housing 1202 includes a chamber (not shown) in communication with the nozzles and also in communication with a source of jetting agent 1210 via a tube or other communication media 1212 The device 1200 is controlled by a control dev ice 1214 that may be any suitable print controller well known to this skilled in the art.

The following examples further illustrate the disclosure but, of course, should not be construed as in any way limiting its scope.

Example 1

A blocking gating agent formulation useful in the present disclosure was prepared as follows:
  8 wt % Sokalan® maleic acid/olefin copolymer (95% actives)
  1 wt % SILWET™ 7200 siloxane block polymer
  91 wt % water

Example 2

A second blocking gating agent formulation useful in the present disclosure was prepared as follows:
  30 wt % PEG 200
  1 wt % Surfynol® 400 series
  1 wt % Pluronic®
  68 wt % water

Example 3

A third blocking gating agent formulation useful in the present disclosure was prepared as follows:
  15 wt % Joncryl® 50
  10 wt % isopropyl alcohol
  1 wt % SILWET™ 7200 siloxane block polymer
  30 wt % PEG 200
  44 wt % water All of the formulations of Examples 1-3 were useful as blocking or gating agents and produced valuable print with a minimum of ghosting, tailing, flooding, or background color.

It will be understood that the foregoing is only illustrative of the principles of the systems and methods disclosed herein, and that various modifications can be made by those skilled in the art without departing from the scope and spirit of such systems and methods. For example, the order of some steps in the procedures that have been described are not critical and can be changed if desired. Also, various steps may be performed by various techniques. In addition, one advantage of the compositions and methods described is the use of standard lithographic inks to produce variable images. These inks typically produce higher quality publications than can be produced using ink jet inks. Until this technology, it was very difficult to produce true variable lithographic printing.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

INDUSTRIAL APPLICABILITY

The present disclosure is applicable in the printing arts, but also may be useful in other industries. More specifically, a gating agent is applied to a substrate to aid in the application of a principle substance in image or non-image areas. The gating agent may include a blocking agent, a surface tension modifying compound, a viscosity modifying compound, a solvent, and/or additional components.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A method for high speed variable printing comprising the steps of:
    jetting a gating agent composition onto a substrate in a pattern, the gating agent composition comprising:
    from about 0.05 to about 10% by weight of a blocking agent;
    up to about 3% by weight of a surface tension modifying compound;
    up to about 8% by weight of viscosity modifier such that the composition has a viscosity within the range of about 1 to 14 mPa s; and
    the balance of the gating agent composition comprises a solvent;
    wherein the gating agent has a static surface tension of less than about 40 dynes/cm; and
    contacting both a first area having the gating agent jetted thereon and a second area not covered by the pattern of the gating agent with a printing agent such that a print image is formed substantially only in the second area;
    wherein the pattern of the gating agent composition determines where the print image is formed.

2. The method of claim 1, wherein the gating agent composition is jetted onto the substrate prior to the application of the printing agent and the gating agent composition prevents the adherence of the printing agent to the substrate in areas where the gating agent has been jetted.

3. The method of claim 2, wherein the substrate is a media upon which the print image is formed.

4. The method of claim 2, wherein the substrate is an intermediate surface that transfers the print image to a final print media.

5. The method of claim 4, wherein the substrate is a print cylinder.

6. The method of claim 1, wherein the gating agent composition does not contain a discernable amount of dye, pigment or other colorant.

7. The method of claim 1, wherein the print image changes from image to image.

8. The method of claim 1, wherein the print image has a fixed image area that does not change.

9. The method of claim 1, wherein the surface modifying compound comprises a nonionic surfactant having a hydrophilic-lipophilic balance between about 15 and 30.

10. The method of claim 1, wherein the composition has a viscosity in the range of from about 3 to about 5 mPa s.

* * * * *